United States Patent [19]

Itoh et al.

[11] Patent Number: 4,672,863
[45] Date of Patent: Jun. 16, 1987

[54] METHOD AND APPARATUS FOR CONTROLLING POWER TRANSMISSION SYSTEM IN AN AUTOMOTIVE VEHICLE

[75] Inventors: Hiroshi Itoh; Mitsuru Takada, both of Toyota, Japan

[73] Assignee: Toyota Jidosha Kabushiki Kaisha, Aichi, Japan

[21] Appl. No.: 852,811

[22] Filed: Apr. 15, 1986

[30] Foreign Application Priority Data

Apr. 17, 1985 [JP] Japan .................................. 60-81792
Apr. 17, 1985 [JP] Japan .................................. 60-81793

[51] Int. Cl.⁴ .................... B60K 41/12; B60K 41/18; B60K 41/16
[52] U.S. Cl. .................................. 74/866; 74/868; 74/689; 74/740
[58] Field of Search ................ 74/867, 868, 866, 689, 74/691, 687, 740

[56] References Cited

U.S. PATENT DOCUMENTS

| | | | |
|---|---|---|---|
| 3,406,597 | 10/1968 | Perry et al. | 74/691 X |
| 3,545,302 | 12/1970 | Schofield | 74/691 |
| 3,861,485 | 1/1975 | Busch | 74/689 X |
| 4,096,768 | 6/1978 | Miyao | 74/687 X |
| 4,170,153 | 10/1979 | Mizuno et al. | 74/867 X |
| 4,254,672 | 3/1981 | Mizuno et al. | 74/687 X |
| 4,290,320 | 9/1981 | Abbott | 74/689 |
| 4,297,918 | 11/1981 | Perry | 74/690 |
| 4,368,653 | 1/1983 | Mizuno et al. | 74/687 X |
| 4,548,098 | 10/1985 | Besson et al. | 74/687 |
| 4,589,303 | 5/1986 | Roberts | 74/740 X |
| 4,608,885 | 9/1986 | Koivunen | 74/740 X |
| 4,610,183 | 9/1986 | Nobumoto et al. | 74/867 X |

FOREIGN PATENT DOCUMENTS

| | | |
|---|---|---|
| 0104033 | 3/1984 | European Pat. Off. |
| 3305924 | 9/1983 | Fed. Rep. of Germany |
| WO85/02663 | 6/1985 | PCT Int'l Appl. |
| 1078791 | 8/1967 | United Kingdom |

Primary Examiner—Rodney H. Bonck
Assistant Examiner—Dirk Wright
Attorney, Agent, or Firm—Parkhurst & Oliff

[57] ABSTRACT

A method of controlling a power transmitting system for an automotive vehicle, having a continuously variable transmission and an auxiliary transmission which is connected with the continuously variable transmission, and which has at least two shift positions for forward driving of the vehicle. The auxiliary transmission is automatically shifted from one of the shift positions to another, based on a detected speed, a detected currently required output of the vehicle, and a detected speed ratio of the continuously variable transmission. Alternatively, the auxiliary transmission is shifted from one of the shift positions to another in response to an operation of a manual shift lever. When a predetermined condition is satisfied after the shift lever is operated to a given position, the auxiliary transmission is permitted to be shifted to the shift position corresponding to the position of the shift lever. This condition is determined based on the detected speed, the currently required output of the vehicle, and the detected speed ratio of the continuously variable transmission. Also disclosed are devices suitable for practicing the methods.

25 Claims, 19 Drawing Figures

FIG. 2

| SHIFT POSITIONS | | HIGH-RANGE CLUTCH 72 | LOW-RANGE BRAKE BAND 74 | REVERSE BRAKE BAND 76 | SPEED-RATIO OF AUX. TRANSMISSION |
|---|---|---|---|---|---|
| L (LOW) AND D (DRIVE) | LOW RANGE | × | ○ | × | $1 + \frac{\rho_1}{\rho_2}$ |
| | HIGH RANGE | ○ | × | × | $1$ |
| N (NEUTRAL) | | × | × | × | $1$ |
| R (REVERSE) | | × | × | ○ | $-(1 - \frac{1}{\rho_2})$ |

SM1: SHIFT LEVER 95 SHIFTED FROM "L" TO "D"?
SM4: SHIFT LEVER 95 SHIFTED FROM "L" TO "D"?

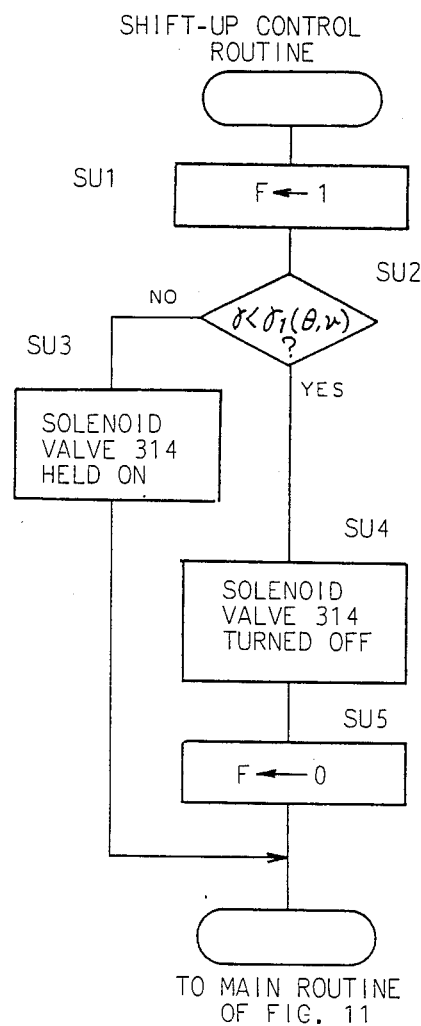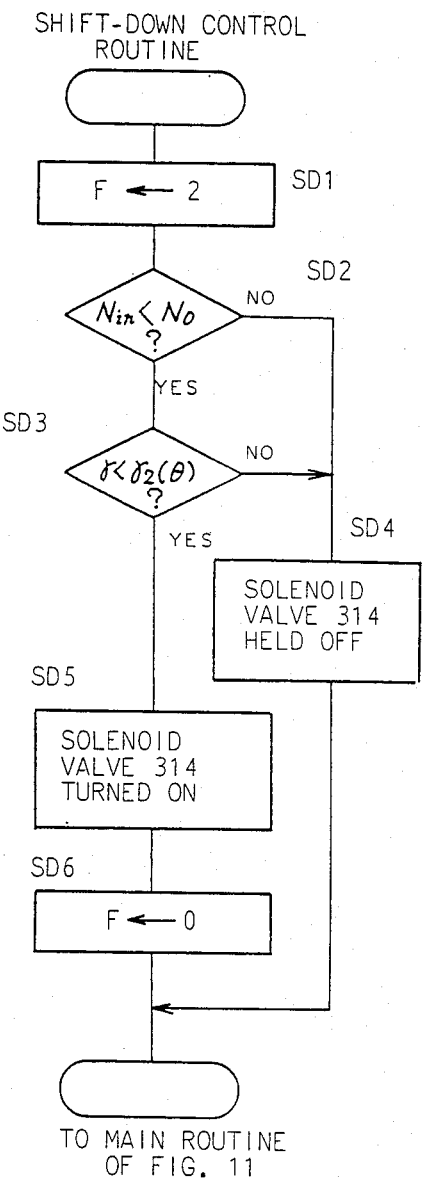

METHOD AND APPARATUS FOR CONTROLLING POWER TRANSMISSION SYSTEM IN AN AUTOMOTIVE VEHICLE

BACKGROUND OF THE INVENTION

The present invention relates to a method and an apparatus for controlling a power transmission system for a motor vehicle.

A power transmitting system for a vehicle including a continuously variable transmission (CVT) is provided with an auxiliary transmission for changing a direction of drive of the vehicle and for improvement in drivability.

In the art of motor vehicles, there is known a power transmitting system incorporating a continuously variable transmission, and an auxiliary or secondary transmission which is connected in series with the continuously variable transmission and which has at least two forward drive shift positions. In this type of power transmitting system, the continuously variable transmission may be designed with a relatively narrow range of speed ratio, and may be accordingly small-sized. In addition, the continuously variable transmission may operate to transmit a relatively large quantity of drive torque without slippage of the belt on the pulleys, when the auxiliary transmission is disposed on the output side of the variable transmission. An example of such type of transmitting system is disclosed in Japanese Patent Application No. 58-144985 assigned to the assignee of the present application.

Generally, the shifting operation of the auxiliary transmission is automatically achieved according to predetermined shift-down and shift-up patterns, based on an opening of a throttle valve and a running speed of the vehicle. The overall speed ratio of the power transmitting system is changed with a change in the speed ratio of the continuously variable transmission. Hence, the condition in which the auxiliary transmission is shifted cannot be constant, and the transmitting system is inevitably subject to a shifting shock of varying magnitude upon shifting operation of the auxiliary transmission. Further, rotating members of the continuously variable transmission, such as variable-diameter pulleys, will have a comparatively large moment of inertia. Thus, the power transmitting system may have a considerable amount of shifting shock when the auxiliary transmission is operated across the different shift positions, whereby the driving feel of the vehicle is adversely influenced.

Similar inconveniences are encountered in a power transmitting system wherein the auxiliary transmission is shifted in response to the operation of an operator-controlled manual shift lever. That is, the transmitting system may have a shifting shock of varying and large magnitudes, due to a change in the speed ratio of the continuously variable transmission, and its relatively large moment of inertia.

SUMMARY OF THE INVENTION

It is therefore an object of the present invention to provide improved method and apparatus of controlling a power transmitting system for an automotive vehicle, having a continuously variable transmission and an auxiliary transmission, which method and apparatus assure smooth shifting operations of the auxiliary transmission with a minimum shift-up or shift-down shock given to the transmitting system.

According to the present invention, there is provided a method of controlling a power transmitting system for an automotive vehicle, having a continuously variable transmission with a continuously variable speed ratio, and an auxiliary transmission which is connected in series with the continuously variable transmission and which has at least two shift positions for forward driving of the vehicle, comprising the step of automatically shifting the auxliary transmission from one of the at least two shift positions to the other, based on an actual running speed of the vehicle, an actually required output of the vehicle and an actual speed ratio of the continuously variable transmission.

According to the invention, there is also provided an apparatus for controlling a power transmitting system for an automotive vehicle, having a continuously variable transmission with a continuously variable speed ratio, and an auxiliary transmission which is connected in series with the continuously variable transmission and which has at least two shift positions for forward driving of the vehicle, comprising: (1) means for detecting an actual running speed of the vehicle; (2) means for detecting an actually required output of the vehicle; (3) means for detecting an actual speed ratio of the continuously variable transmission; and control means for determining a timing at which the auxiliary transmission is shifted from one of the at least two shift positions to the other. The control means determines the timing based upon the detected actual running speed of the vehicle, the detected actually required output of the vehicle, and the detected actual speed ratio of the continuously variable transmission, and according to a predetermined relation among the actual running speed, the actually required output and the actual speed ratio. The control means controls the auxiliary transmission so as to be shifted at the determined timing.

In the method and apparatus of the invention described above, a shift-up or shift-down operation of the auxiliary transmission is automatically effected based not only on the actual running speed and actually required output of the vehicle, but also on the actual speed ratio of the continuously variable transmission. In other words, the timing of the automatic shifting operation of the auxiliary transmission is determined with the speed ratio of the continuously variable transmission taken into account, in order to minimize a shift-up or shift-down shock to the power transmitting system.

According to another aspect of the present invention, there is provided a method of controlling a power transmitting system for an automotive vehicle, having a continuously variable transmission with a continuously variable speed ratio, and an auxiliary transmission which is connected in series with the continuously variable transmission and which has at least two shift positions for forward driving of the vehicle, wherein the auxiliary transmission is shifted from one of the at least two shift positions to the other, in response to an operation of a shift lever, the method comprising the step of determining a condition which permits the auxiliary transmission to be shifted from the one shift position to the other, based on an actually required output of the vehicle, an actual running speed of the vehicle and an actual speed ratio of the continuously variable transmission.

According to a further aspect of the invention, there is provided an apparatus for controlling a power transmitting system for an automotive vehicle, having a continuously variable transmission with a continuously variable speed ratio, and an auxiliary transmission which is connected in series with the continuously variable transmission and which has at least two shift positions for forward driving of the vehicle, wherein the auxiliary transmission is operated in response to an operation of a shift lever which has at least two operating positions corresponding to the shift positions of the auxiliary transmission, the apparatus comprising: (1) means for detecting the currently selected operating position of the shift lever; (2) means for detecting an actually required output of the vehicle; (3) means for detecting an actual running speed of the vehicle; (4) means for detecting an actual speed ratio of the continuously variable transmission; and (5) control means for determining a condition which permits the auxiliary transmission to be shifted to one of said at least two shift positions which corresponds to the currently selected operating position of the shift lever. The control means determines the above condition, based on the detected actually required output of the vehicle, the detected actual running speed of the vehicle, and the detected actual speed ratio of the continuously variable transmission, and according to a predetermined relation among the detected actually required output, the detected actual running speed and the detected actual speed ratio. The control means controls the auxiliary transmission to be shifted to the above-indicated one shift position when the determined condition is satisfied after the currently selected operating position is detected.

In the method and apparatus described above, the condition which permits the auxiliary transmission to be shifted to the shift position corresponding to the currently selected position of the shift lever, is determined based on the actual speed ratio of the continuously variable transmission, as well as on the actual running speed and actually required output of the vehicle. Consequently, the auxiliary transmission is shifted under an optimum condition depending upon the speed ratio of the continuously variable transmission, with a minimum shift-up or shift-down shock to the transmitting system.

BRIEF DESCRIPTION OF THE DRAWINGS

The foregoing and other objects, features and advantages of the present invention will be readily appreciated as the same becomes better understood by reference to the following detailed description, when considered in connection with the accompanying drawings, in which:

FIG. 2 is a view showing a relation between shift positions of an auxiliary transmission and operating states of a frictional coupling assembly of the auxiliary transmission;

FIGS. 12 and 13 are flow charts illustrating control routines included in the main control routine of FIG. 11.

DETAILED DESCRIPTION OF THE PREFERRED EMBODIMENTS

Referring to the accompanying drawings, the preferred embodiments of the invention will be described.

Figure 1:
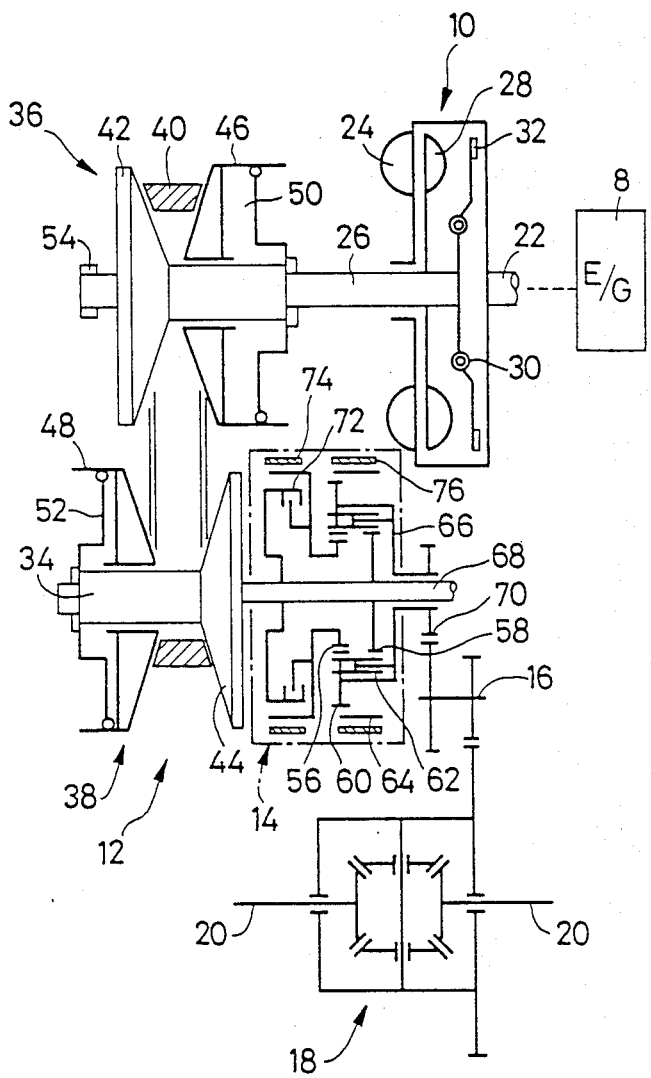
FIG. 1 is a schematic illustration of essential parts of a power transmitting system for a motor vehicle, to which the present invention is applicable.

There is shown in FIG. 1 a hydraulically-operated power transmitting system for a motor vehicle, for transmitting power of an engine 8 to drive wheels of a motor vehicle, via a fluid coupling 10, a continuously variable transmission 12 of belt-and-pulley type (hereinafter referred to as "CVT"), an auxiliary transmission 14, an intermediate gear train 16, a differential gear 18 and axles 20.

The fluid coupling 10 includes a pump impeller 24 connected to a crankshaft 22 of the engine 8, a turbine 28 fixed to an input shaft 26 of the CVT 12 and rotated by the pump impeller 24 via a fluid in the coupling 10, and a direct-coupling lock-up clutch 32 secured to the input shaft 26 via dampers 30. The direct-coupling lock-up clutch 32 is engaged to directly connect the crankshaft 22 to the input shaft 26 of the CVT 12, when the running speed of the motor vehicle or the rotating speed of the engine 8 or turbine 28 has exceeded a predetermined level.

The CVT 12 includes a variable-diameter input pulley 36 disposed on the input shaft 26, a variable-diameter output pulley 38 disposed on an output shaft 34, and a transmission belt 40 connecting the input and output pulleys 36, 38. The variable-diameter input pulley 36 has a stationary rotor 42 fixed to the input shaft 26, while the variable-diameter output pulley 38 has a stationary rotor 44 fixed to the output shaft 34. Further, the input and output pulleys 36, 38 have movable rotors 46, 48 which are respectively disposed on the input and output shafts 26, 34 such that the movable rotors 46, 48 are movable in the axial direction of the shafts 26, 34, but not rotatable relative to the shafts 26, 34. The stationary and movable rotors 42, 46 of the input pulley 36 cooperate to define a V-groove whose width is variable when the movable rotor 46 is moved on the input shaft 26 by a hydraulic cylinder 50. Similarly, the stationary and movable rotors 44, 48 of the output pulley 38 cooperate to define a V-groove whose width is variable when the movable rotor 48 is moved on the output shaft 34 by a hydraulic cylinder 52. Thus, effective diameters of the input and output pulleys 36, 38 engaging the transmission belt 40 are variable to change a speed ratio γ of the CVT 12 ("Nin"/"Nout": a ratio of the rotating speed "Nin" of the input shaft 26, to the rotating speed "Nout" of the output shaft 34). The hydraulic cylinder 50 serves primarily for changing the speed ratio γ of the CVT 12. The hydraulic cylinder 52 serves primarily for adjusting a tension of the transmission belt 40, so that the tension is held at a minimum level to the extent that permits the belt 40 to attain power transmission without slippage on the input and output pulleys 36, 38. Reference numeral 54 designates an oil pump which is connected to the crankshaft 22 by a connecting rod (not shown) which extends through the input shaft 26. The oil pump 54, which is thus driven by the engine 8, serves as a hydraulic source for a hydraulic system which will be described.

The auxiliary transmission 14 is connected in series to the CVT 12, and is automatically placed selectively in a Low-Range and a High-Range position, depending upon the running conditions of the motor vehicle. The auxiliary transmission 42 is disposed coaxially with the output shaft 34 of the CVT 12, and includes a complex planetary gear set of RAVIGNEAUX type. This complex planetary gear set includes a first and a second sun gear 56, 58, a first planetary gear 60 meshing with the first sun gear 56, a second planetary gear 62 meshing with the second sun gear 58, a ring gear 64 meshing with the first planetary gear 60, and a planet carrier 66 which rotatably supports the first and second planetary gears 60, 62. The second sun gear 58 is coupled to a shaft 68 which is integral with the output shaft 34 of the CVT 12. The carrier 66 is connected to an output gear 70. A high-range clutch 72 is applied to connect the first sun gear 56 and the shaft 68, while a low-range brake band 74 is applied to hold the first sun gear 56 stationary. The ring gear 64 is held stationary by a reverse brake band 76.

FIG. 2 shows operating states of the above elements of a frictional coupling assembly built in the auxiliary transmission 14, and speed reduction ratios, in relation with shift positions of the transmission 42. In the figure, marks "o" indicate the engagement or application of the clutch or band 72, 74, 76, while marks "x" indicate their disengagement or release. Values p1 and p2 are obtained from the following equations:

$$p1 = Zs1/Zr$$

$$p2 = Zs2/Zr$$

where
$Zs1$: number of teeth of the first sun gear 56,
$Zs2$: number of teeth of the second sun gear 58,
$Zr$: number of teeth of the ring gear 64.

Stated more specifically, a low range in a shift position L (Low) or D (Drive) is established with the first sun gear 56 held stationary by application of the low-range brake band 74. In this low range, the power transmission by the auxiliary transmission 14 is effected at a reduction ratio of $(1+p1/p2)$. A high range in the shift position L or D is established by the engagement of the high-range clutch 72, which causes the planetary gear set to rotate together with the clutch 72. In this high range, the power transmission is effected at a reduction ratio of 1. In a shift position R (Reverse), the reverse brake band 76 is applied to hold the ring gear 64 stationary, whereby the power transmission is effected in the reverse direction at a reduction ratio of $-(1-1/p2)$.

The output gear 70 of the auxiliary transmission 14 is connected to the differential gear 18 via the intermediate gear 16. Thus, the power of the engine 8 is distributed by the differential gear 18 to the right and left axles 20, and thereby transmitted to the right and left drive wheels of the vehicle.

Figure 3A:
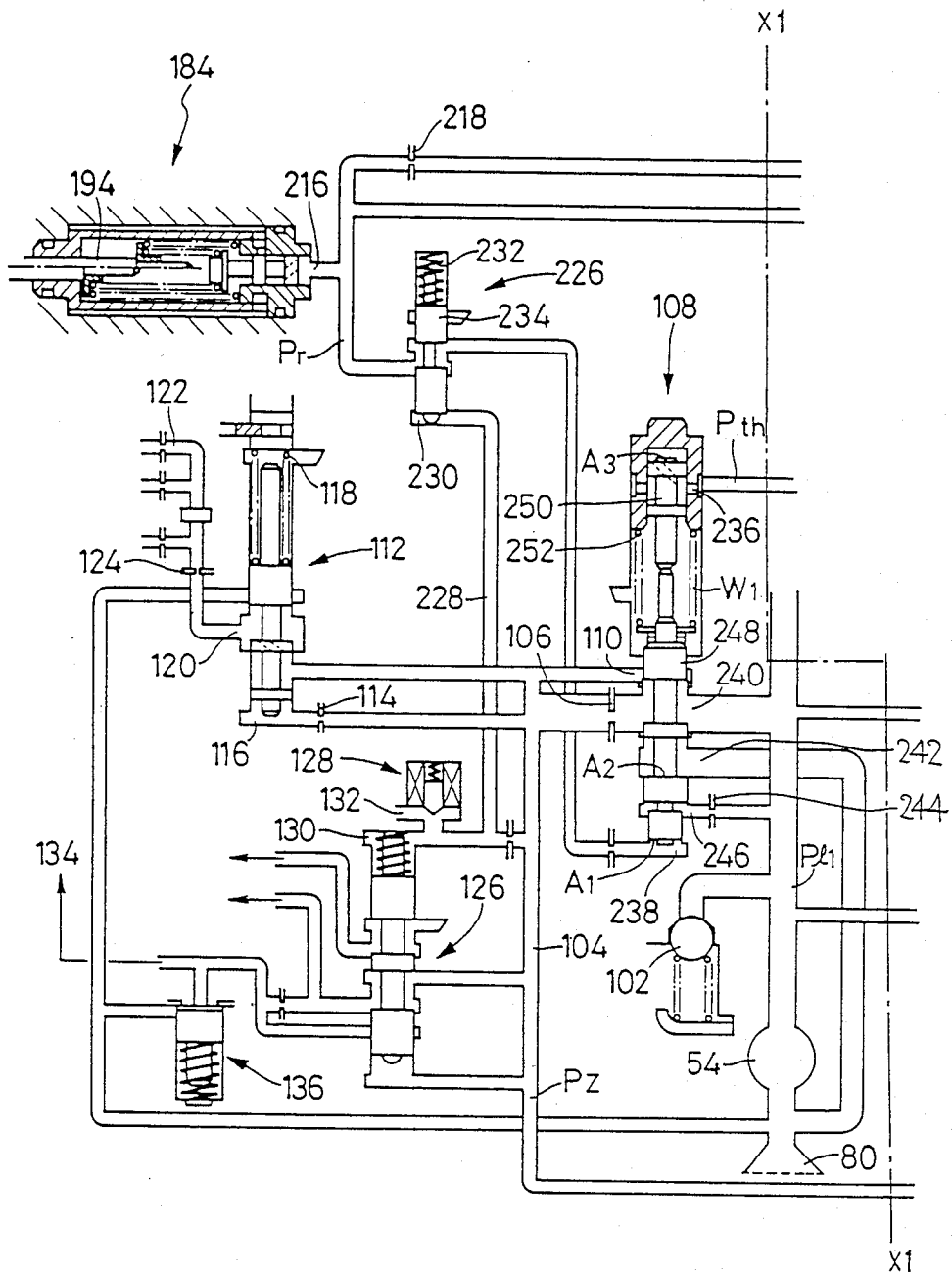
FIGS. 3A, 3B and 3C are schematic views of a hydraulic system for controlling the operation of the power transmitting system of FIG. 1.
Figure 3B:
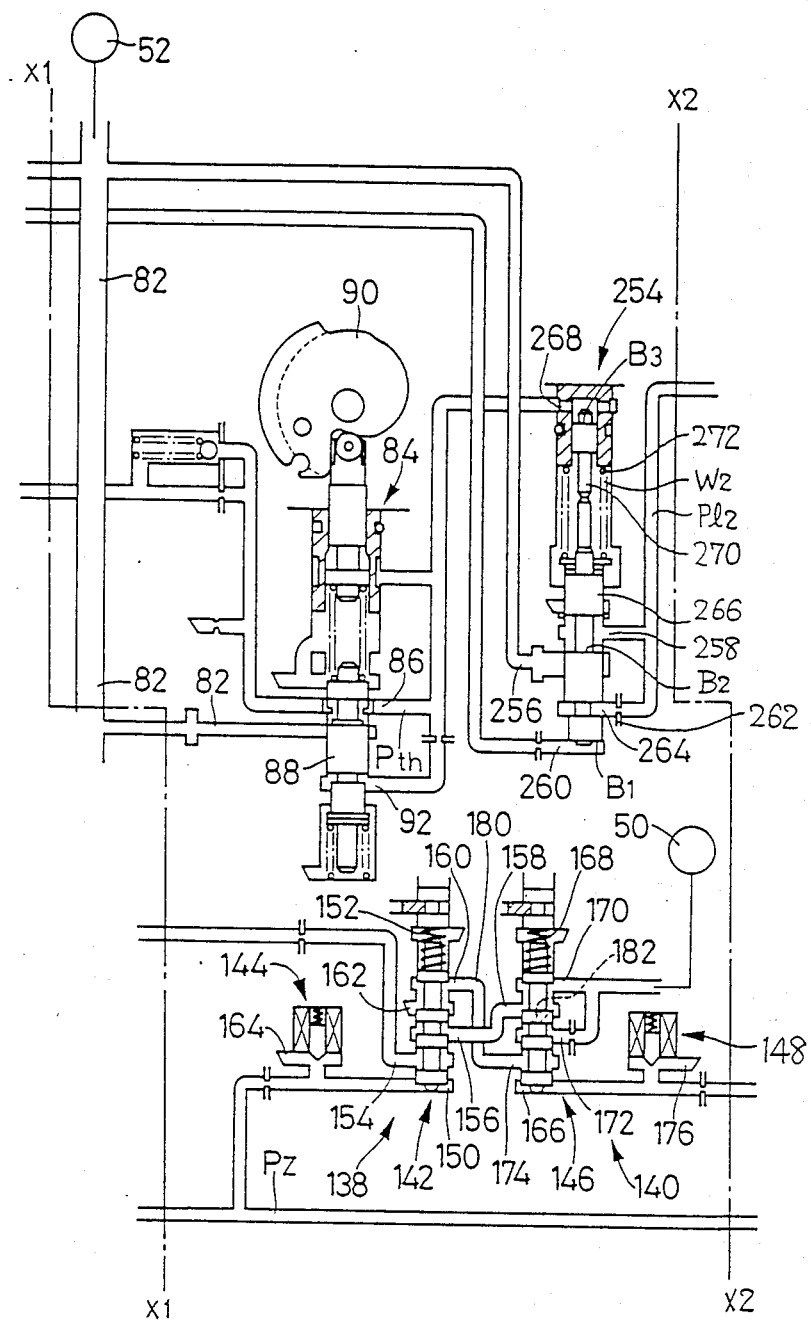
Figure 3C:
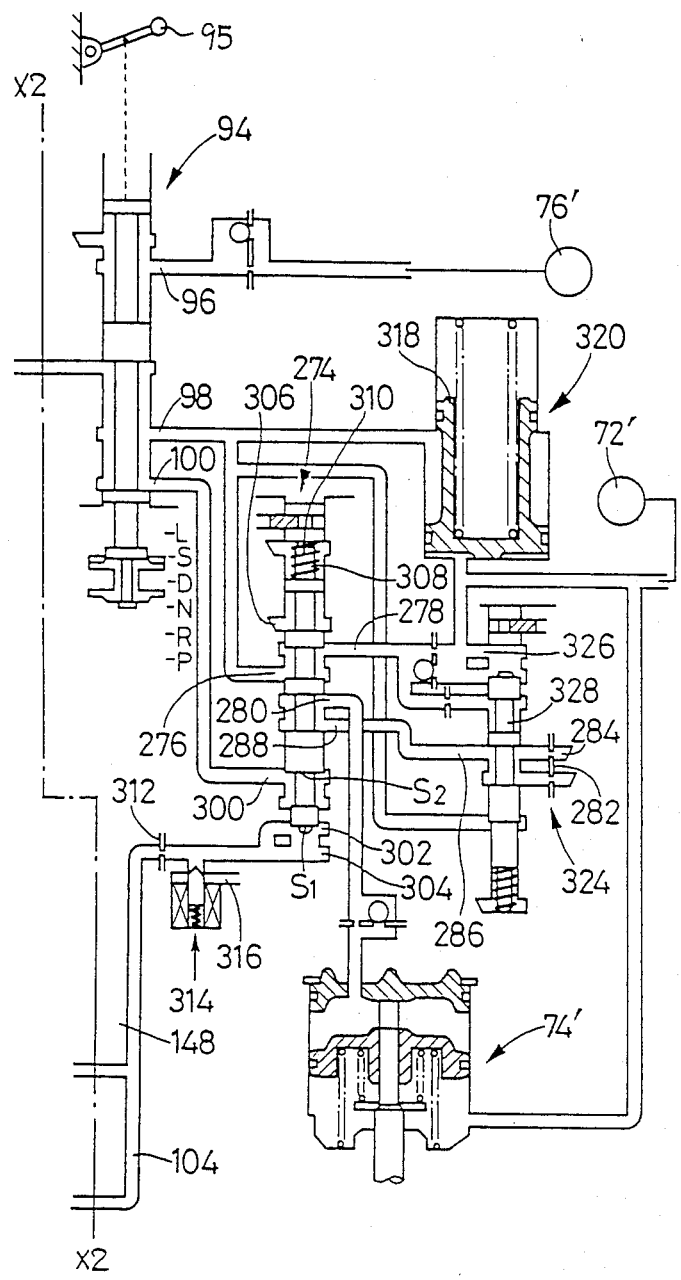

A hydraulic system for the power transmitting system of FIG. 1 is illustrated in FIGS. 3A, 3B and 3C, wherein the oil pump 54 (FIG. 3A) sucks up a working fluid in an oil reservoir (not shown), through a strainer 80, and delivers the fluid under pressure to a line conduit 82. A throttle sensitive valve generally indicated at 84 in FIG. 3B generates at its output port 86 a throttle pressure "Pth" which corresponds to throttle opening $\theta$ of a throttle valve (not shown) which is disposed in the intake manifold of the engine 8 and is operated by accelerator (not shown). The throttle cam 90 is rotated as the opening $\theta$ of the throttle valve is changed. The throttle valve 84 has a valve spool 88 which receives a force which is determined by an angular position of the throttle cam 90, and also receives the throttle pressure "Pth" from a control port 92 as a feedback pressure. The operating pressure and the feedback pressure act on the valve spool 88 in the opposite directions. Thus, the valve spool 88 controls the communication between the line conduit 82 and the output port 86. There is provided a manual valve 94 (FIG. 3C) having a spool whose axial position is changed according to a selected position of an operator-controlled shift lever 95 which has six shift positions L (Low), S (Second), D (Drive), N (Neutral), R (Reverse) and P (Parking). The manual valve 94 applies a second line pressure Pl2 of an output port 258 of a sub-primary pressure regulating valve 254 (which will be described), to its port 96 which leads to a hydraulic actuator 76' for the reverse brake band 76 when the shift position R (Reverse) is selected, but to its port 98 when the shift position L (Low) or S (Second) is selected. In the shift position D (Drive), the manual valve 94 applies the second line pressure Pl2 to its ports 98 and 100. To protect the hydraulic control device, a pressure relief valve 102 is provided to release the working fluid from the line conduit 82 when a first line pressure Pl1 in the line conduit 82 exceeds a predetermined upper limit.

A secondary pressure conduit 104 is connected to the line conduit 82 through an orifice 106, and through a port 110 of a primary pressure regulator valve 108 through which an excess of the fluid is drained from the valve 108. The secondary pressure conduit 104 is connected through an orifice 114 to a control chamber 116 which is formed in a secondary pressure regulator valve 112. This regulator valve 112 controls the communication between the secondary pressure conduit 104 and a port 120, according to the pressure in the control chamber 116 in relation to a biasing force of a spring 118, so that a secondary pressure Pz in the secondary pressure conduit 104 is maintained at a suitable level. The secondary pressure conduit 104 is connected to a lubrication conduit 122 via the port 120 and an orifice 124. The previously indicated direct-coupling lock-up clutch 32 incorporated in the fluid coupling 10 is engaged or disengaged under control of a lock-up control valve 126 which applies the secondary pressure Pz in the secondary pressure conduit 104 selectively to one of opposite sides (engagement side or release side) of the lock-up clutch 32. A solenoid valve 128 is provided to control the communication between a control chamber 130 of the lock-up control valve 126 and a drain 132. When the solenoid valve 128 is off (deenergized), the secondary pressure Pz of the secondary pressure conduit 104 is applied to the release side of the lock-up clutch 32, whereby the power from the engine 8 is transmitted to the CVT 12 through the fluid-coupling 10. When the solenoid valve 128 is on (energized), the secondary pressure Pz of the secondary pressure conduit 104 is applied to the engagement side of the lock-up clutch 32 and to an oil cooler 134. In this condition, the engine power is transmitted to the CVT 12 through the lock-up clutch 32. The fluid pressure in the oil cooler 134 is adjusted by a cooler by-pass valve 136.

A speed-ratio control valve assembly includes a shift-direction control valve unit 138 and a shift-speed control valve unit 140. The shift-direction control valve unit 138 has a first spool valve 142, and a first solenoid valve 144, while the shift-speed control valve unit 140 has a second spool valve 146 and a second solenoid valve 148. While the first solenoid valve 144 is off, the spool of the first spool valve 142 is moved toward a spring 152 by the secondary pressure Pz in a control chamber 150. In this condition, the first line pressure Pl1 at a port 154 is applied to a port 158 of the second spool valve 146 via a port 156 of the first spool valve 142, and a port 160 is not in communication with a drain 162, whereby the speed ratio γ of the CVT 12 is reduced. While the first solenoid valve 144 is on, the spool of the first spool valve 142 is pushed toward the chamber 150 by the spring 152. In this condition, the first line pressure pl1 is not applied to the port 156, and the port 160 is brought into communication with the drain 162, whereby the speed ratio γ of the CVT 12 is increased.

While the second solenoid valve 148 is off, the spool of the second spool valve 146 is pushed toward a spring 168 by the secondary pressure Pz in a control chamber 166. In this condition, the port 158 is not in communication with a port 170, and a port 172 is in communication with a port 174. The ports 170 and 172 are held in communication with the input hydraulic cylinder 50 of the CVT 12. While the second solenoid valve 148 is on, the hydraulic pressure in the control chamber 166 is drained through a drain 176 of the valve 148, and the ports 158 and 170 communicate with each other while the ports 172 and 174 are not in communication. The port 174 is connected with the port 160 through a line 180. An orifice 182 is provided in the second spool valve 146 to permit a small flow of the fluid from the port 158 to the port 170 while the second solenoid valve 148 is off. In the above arrangement, therefore, the fluid is supplied to the input hydraulic cylinder 50 of the CVT 12 at a high rate while the first solenoid valve 144 is off and the second solenoid valve 148 is on, whereby the speed ratio "γ" of the CVT 12 is decreased relatively rapidly. While the first and second solenoid valves 144 and 148 are both off, the supply of the fluid to the hydraulic cylinder 50 is accomplished through the orifice 182, and consequently the speed ratio "γ" is decreased slowly. While the first and second solenoid valves 144 and 148 are both on, the hydraulic cylinder 50 of the CVT 12 is not supplied with the pressurized fluid, whereby the speed ratio "γ" of the CVT 12 is held constant. While the first solenoid valve 144 is on and the second solenoid valve 148 is off, the fluid in the hydraulic cylinder 50 is discharged through the drain 162, and the speed ratio "γ" of the CVT 12 is rapidly increased.

There is shown in FIG. 3A a speed-ratio sensing valve 184 which has a rod 194 slidably engaging the movable rotor 46 of the input pulley 36. With an axial movement of the movable rotor 46 on the input shaft 26, the rod 194 is axially moved by the same distance as the movable rotor 46. The fluid is supplied to the sensing valve 184, and the amount of discharge of the fluid from the sensing valve 184 is increased as the distance of the movable rotor 46 relative to the stationary rotor 42 of the input pulley 36 is increased. Consequently, a speed-ratio pressure Pr at an output port 216 of the sensing valve 184 is lowered as the speed ratio "γ" of the CVT 12 is increased. The speed-ratio pressure Pr is established by controlling the amount of discharge of the fluid from the output port 216.

A cut-off valve 226 includes a chamber 230 which communicates with the control chamber 130 of the lock-up control valve 126 via a line 228, and further includes a spool 234 which is moved based on the pressure in the chamber 230 and a biasing force of a spring 232. While the solenoid valve 128 is off, that is, while the lock-up clutch 32 is released (for absorbing a shock of the transmission system when the auxiliary transmission 14 is shifted), the cut-off valve 226 is placed in its closed position to prevent the speed-ratio pressure Pr from being applied to the primary pressure regulator valve 108.

The primary pressure regulator valve 108, which serves as first pressure-generating means, has: a port 236 to which the throttle pressure Pth is applied; a port 238 to which the speed-ratio pressure Pr is applied; a port 240 connected to the line conduit 82; a port 242 connected to a suction side of the oil pump 54; a port 246 to which the first line pressure Pl1 is applied via an orifice 244; a spool 248 which is axially movable to control the communication between the ports 240 and 242; a spool 250 which receives the throttle pressure Pth and biases the spool 248 toward the port 238; and a spring 252 which biases the spool 248 toward the port 238.

While the cut-off valve 226 is open and the speed-ratio pressure Pr is applied to the port 238, the following equation is established:

$$Pl1 = (A3 \cdot Pth + W1 - A1 \cdot Pr)/(A2 - A1) \qquad (1)$$

where
A1: cross sectional area of the lowermost land of the spool 248,
A2: cross sectional area of the land next to the lowermost land of the spool 248,
A3: cross sectional area of the land of the spool 250 receiving the throttle pressure Pth,
W1: biasing force of the spring 252.

While the cut-off valve 226 is closed and the speed-ratio pressure Pr is not applied to the port 238, the following equation is established:

$$Pl1 = (A3 \cdot Pth + W1)/(A2 - A1) \qquad (2)$$

The previously indicated sub-primary pressure regulator valve 254 (FIG. 3B), which serves as second pressure-generating means, has: an input port 256 to which is applied the first line pressure Pl1; a port 258 at which the second line pressure Pl2 is present; a port 260 to which is applied the speed-ratio pressure Pr; a port 264 to which is applied through an orifice 262 the second line pressure Pl2 which serves as a feedback pressure; a spool 266 which controls the communication between the input and output ports 256 and 258; a port 268 to which the throttle pressure Pth is applied; a spool 270 which receives the throttle pressure Pth and biases the spool 266 toward the port 260; and a spring 272 which biases the spool 266 toward the port 260. In this sub-primary pressure regulator valve 254, the following equation is established:

$$Pl2 = (B3 \cdot Pth + W2 - B1 \cdot Pr)/(B2 - B1) \qquad (3)$$

where

B1: cross sectional area of the lowermost land of the spool 266,

B2: cross sectional area of the land next to the lowermost land of the spool 266, B3: cross sectional area of the land of the spool 270 receiving the throttle pressure Pth, W2: biasing force of the spring 272.

A shift valve 274 (FIG. 3C) is provided to supply the fluid selectively to a hydraulic actuator 72' for the high-range clutch 72 of the auxiliary transmission 14, or to a hydraulic actuator 74' for the low-range brake band 74. The shift valve 274 has: a port 276 to which is applied the second line pressure Pl2 while the shift position D, S or L is selected; output ports 278, 280; a port 288 communicating with a drain 284 via an orifice 282; a control port 300 to which is applied the first line pressure Pl1 from the port 100 of the manual valve 94 when the shift position D is selected; other control ports 302, 304; a drain 306; a spool 308; and a spring 310 biasing the spool 308 toward the port 304. The secondary pressure Pz is applied to the control ports 302, 304 via an orifice 312, and the pressure at the control ports 302, 304 is regulated by a solenoid valve 314. The two lands of the spool 308 as counted from its bottom have cross sectional areas S1 and S2, respectively. The area S1 is smaller than the area S2. The solenoid valve 314 is turned on and off in relation to driving parameters of an automotive vehicle.

When the spool 308 is located on the side of the spring 310, the input port 276 is in communication with the output port 278, and the output port 280 is in communication with the port 288. Accordingly, the second line pressure Pl2 is delivered from the output port 278 to an accumulator 320, and to the hydraulic actuator 72' for the high-range clutch 72, and the hydraulic actuator 74' for the low-range brake band 74 is drained, whereby the auxiliary transmission 14 is placed in the high-range position.

When the spool 308 is located on the side of the port 304, the input and output ports 276, 280 communicate with each other, and the output port 278 is in communication with the drain 306. Consequently, the second line pressure Pl2 from the output port 280 is delivered to the hydraulic actuator 74' of the low-range brake band 74, and the hydraulic actuator 72' for the high-range clutch 72 is drained, whereby the auxiliary transmission 14 is placed in the low-range position.

While the shift position L or S is selected, the first line pressure Pl1 is not applied to the control port 300. Therefore, when the solenoid valve 314 is turned off, the spool 308 is moved toward the spring 310 initially by the secondary pressure Pz acting on the land with the cross sectional area S2, and subsequently by the secondary pressure Pz acting on the land with the cross sectional area S1. When the solenoid valve 314 is turned on, the pressure at the control ports 302, 304 is decreased and the spool 308 is moved by the spring 310 toward the port 304. In the shift position L or S, therefore, the auxiliary transmission 14 may be switched between its high-range and low-range positions according to the on-off states of the solenoid valve 314.

In the shift position D, the first line pressure Pl1 is applied to the control port 300. Consequently, once the spool 308 has been located on the side of the spring 310, the first line pressure Pl1 from the control port 300 acts on the land with the cross sectional area S2. Subsequently, the spool 308 is held located on the side of the spring 310, irrespective of the subsequent on-off state of the solenoid valve 314, whereby the auxiliary transmission 14 is held in its high-range position.

A shift-timing valve 324 (FIG. 3C) has: a control port 326 communicating with the hydrauylic actuator 72' for the high-range clutch 72; a spool 328 whose axial position is controlled by the pressure at the control port 326. The shift-timing valve 324 controls the amount of flow of the fluid into the hydraulic actuator 72', and the amounts of flow of the fluid into and from the hydraulic actuators 72' and 74', respectively, when the auxiliary transmission 14 is shifted up.

Figure 4:
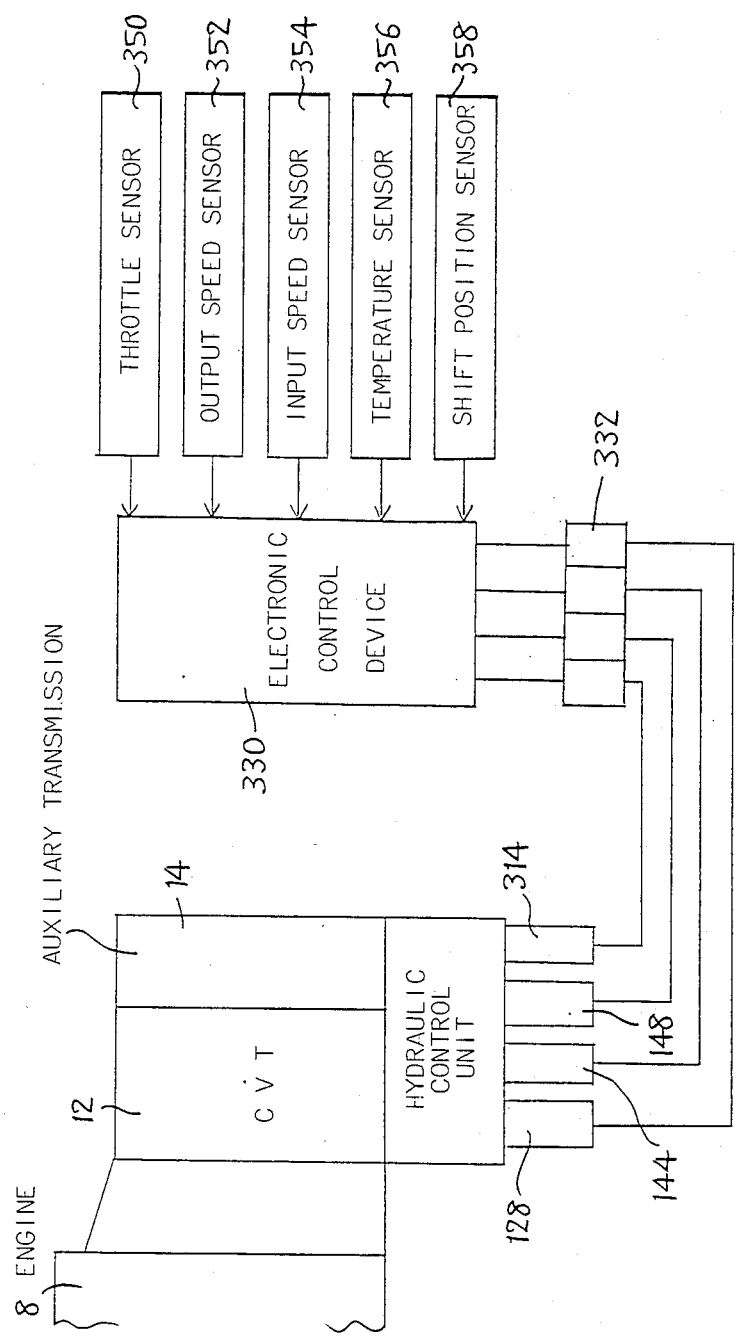
FIG. 4 is a schematic diagram showing a general control arrangement including one embodiment of a control device of the invention for controlling the power transmitting system.

FIG. 4 is a schematic block diagram showing a general arrangement of a hydraulic control device for controlling the power transmitting system which has been described above. The control arrangement includes an electronic control device 330 incorporating a microcomputer which includes a central processing unit, a random-access memory, a read-only memory, etc. The electronic control device 330 receives: a THROTTLE signal indicative of an opening θ of the throttle valve 84, which THROTTLE signal is produced by a throttle sensor 350 which serves as means for detecting a currently required output of the engine 8; an OUTPUT SPEED signal indicative of the rotating speed "Nout" of the output shaft 34 of the CVT 12 (rotating speed "Nin" of the input shaft of the auxiliary transmission 14), which OUTPUT SPEED signal is produced by an output speed sensor 352; an INPUT SPEED signal indicative of the rotating speed "Nin" of the input shaft 26 of the CVT 12, which INPUT SPEED signal is produced by an input speed sensor 354; a COOLANT TEMP. signal indicative of a temperature Tw of a coolant for cooling the engine 8, which COOLANT TEMP. signal is produced by a temperature sensor 356; and a SHIFT POSITION signal indicative of the selected shift position of the previously indicated shift lever 95 connected to the manual valve 94, which SHIFT POSITION signal is produced by a shift position sensor 358. The central processing unit in the electronic control device 330 processes the above-indicated signals according to a control program stored in the read-only memory, while utilizing a temporary storage function of the random-access memory. Based on the processed signals, the central processing unit applies control signals to the solenoid valves 128, 144, 148 and 314, via respective amplifiers 332, to operate these solenoid valves.

Figure 9:
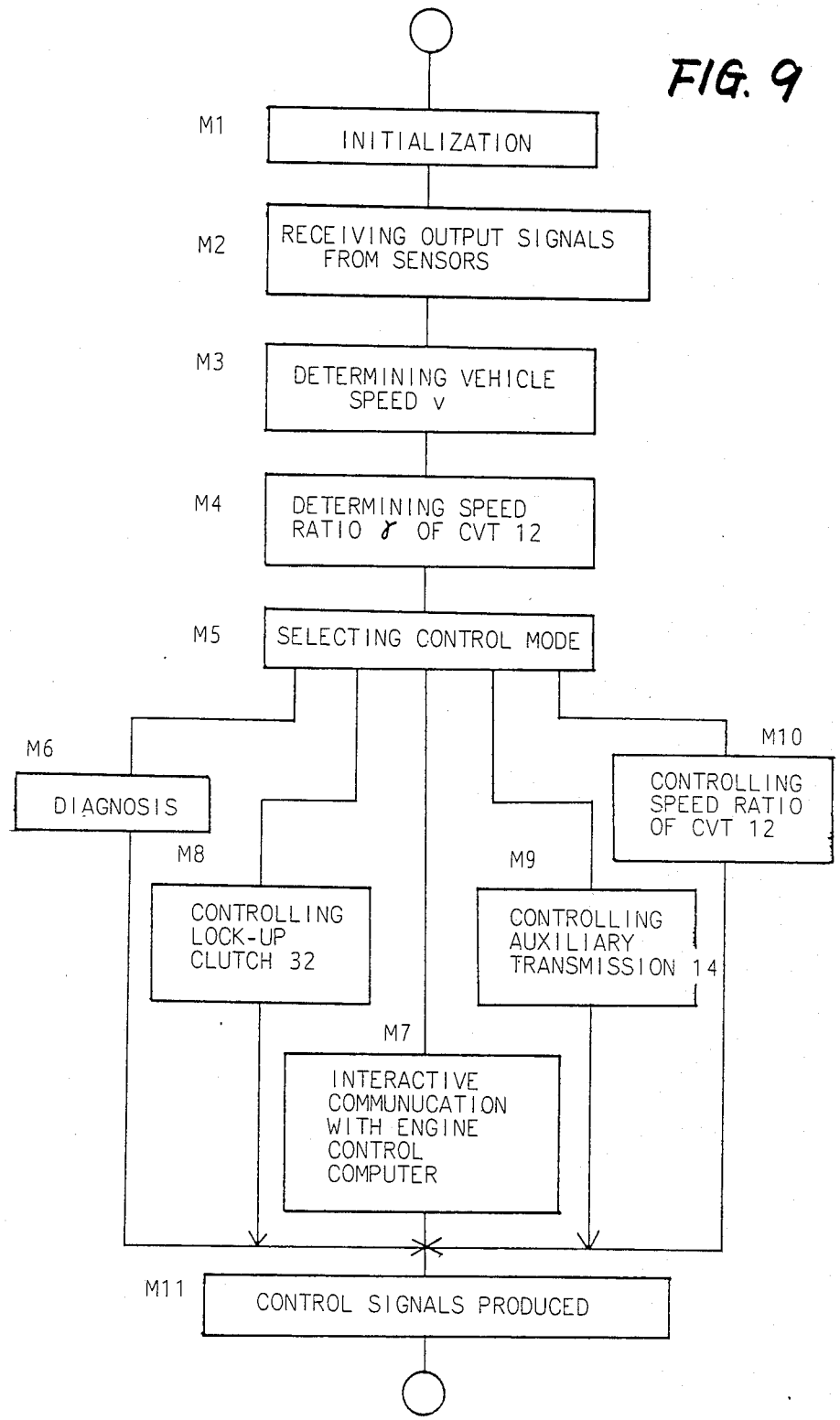
FIG. 9 is a flow chart showing a main control routine which includes a control routine of FIG. 5.

The electronic control device 330 is adapted to execute a main routine illustrated in FIG. 9. In the main routine, the control device 330 is initialized in step M1, and receives in step M2 the various output signals from the sensors 350, 352, 354, 356 and 358 indicated above. Step M2 is followed by step M3 to determine an actual running speed v of the motor vehicle, based on the rotating speed "Nout" of the output shaft 34 of the CVT 12, a gear ratio of a transmission system between the auxiliary transmission 14 and the drive wheels, and a radius of the drive wheels. In the present embodiment, this step M3 corresponds to means for detecting the running speed of the vehicle. Step M3 is followed by step M4 to determine the actual speed ratio γ of the CVT 12, based on the rotating speed "Nin" of the input shaft 26, and the rotating speed "Nout" of the output shaft 34. This step M4 corresponds to means for detecting the speed ratio of the CVT 12. Then, step M5 is executed to select one of five control modes, according to the output signals from the sensors. More specifically, step M5 is followed by one of the following six steps: M6 for diagnosing the engine 8, CVT 12, etc. for normal functioning; M7 for interactive communication of the control device 330 with a computer which controls the ignition timing, fuel injection amount, and other parameters of the engine 8; M8 for controlling the solenoid valve 128 for the lock-up clutch 32, based on the determined running speed v of the vehicle and the detected opening $\theta$ of the throttle valve 84, and according to a predetermined relation between these values v and $\theta$; M9 for automatic control of the auxiliary transmission 14 between the high-range and low-range positions, based on the running speed v of the vehicle, opening $\theta$ of the throttle valve 84 and speed ratio $\gamma$ of the CVT 12; and M10 for controlling the speed ratio $\gamma$ of the CVT 12.

Referring to a flow chart of FIG. 5, the automatic control of the auxiliary transmission 14 between its high-range and low-range positions in step M9 will be described in detail.

Initially, step S1 is executed to check if the auxiliary transmission 14 is currently placed in its high-range or low-range position. This checking is accomplished based on, for example, the control signal currently applied to the solenoid valve 314. If the auxiliary transmission 14 is found in step S1 to be placed in the low-range position, steps S2–S4 are executed to shift up the auxiliary transmission 14 from the low-range position to the high-range position.

In step S2, the control device 330 checks if the determined actual running speed v of the vehicle is higher than or equal to a predetermined value "$v_o$" stored in the control device 330. This value "$v_o$" is set to establish a limit of the running speed v of the vehicle beyond which it is necessary to hold the auxiliary transmission 14 in its high-range position. Step S2 is followed by step S3 to check if the determined speed ratio $\gamma$ of the CVT 12 is smaller than or equal to a predetermined value $\gamma(\theta)$ which is determined as a function of the actually detected opening $\theta$ of the throttle valve, as indicated in FIG. 6. Namely, step S3 is for checking if the detected throttle opening $\theta$ and speed ratio $\gamma$ fall within a range indicated in hatched lines in FIG. 6. If the judgement in step S2 or S3 is negative (NO), the control routine of FIG. 5 is terminated.

If the judgement in step S3 reveals that the determined speed ratio $\gamma$ of the CVT 12 is smaller than or equal to the predetermined value $\gamma(\theta)$, step S4 is executed to deenergize the solenoid valve 314, whereby the auxiliary transmission 14 is shifted up from the low-range position to the high-range position.

In the case where the judgement in step S1 indicates that the auxiliary transmission 14 is placed in the high-range position, step S1 is followed by steps S5 and S6 to check if the actual running speed v of the vehicle is lower than or equal to predetermined values v2 and v1. The value v2, which is equal to or larger than the value v1, is set to establish a limit of the vehicle speed v below which the auxiliary transmission 14 may be shifted from the high-range position down to the low-range position, without an excessive rise in the speed of the engine 8, and without an excessive shift-down shock. The value v1 is used to judge whether a shift condition of FIG. 7 or a shift condition of FIG. 8 should be satisfied.

Figure 5:
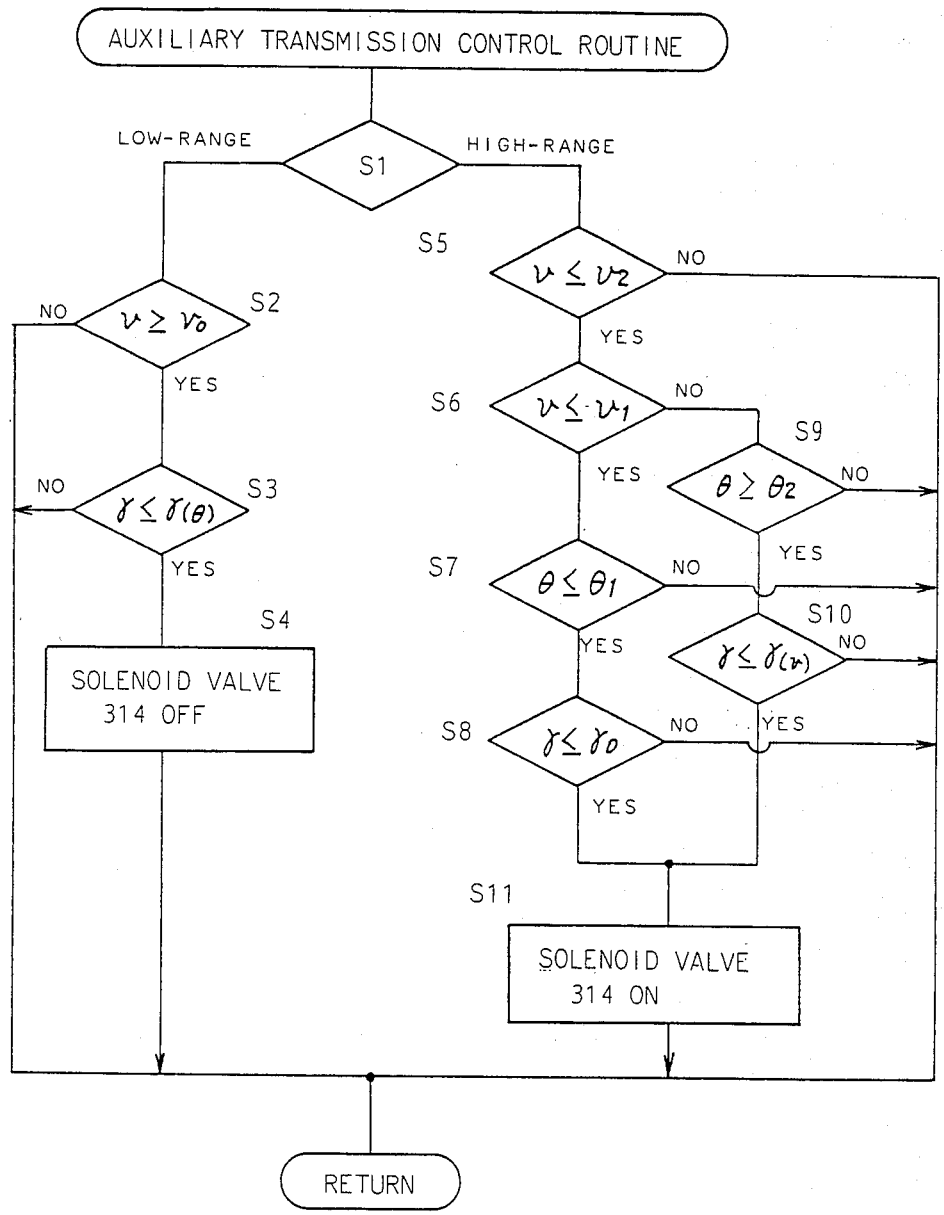
FIG. 5 is a flow chart showing an operation of the control device of FIG. 4, according to one embodiment of a method of the invention.
Figure 6:
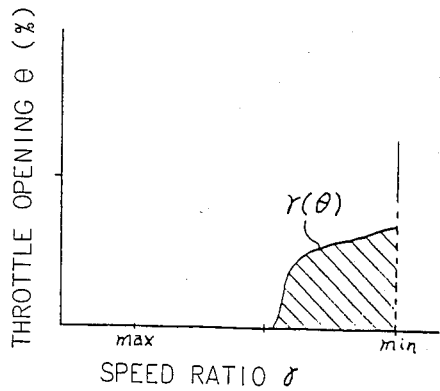
FIGS. 6, 7 and 8 are graphs illustrating ranges of reference values used in judgements in the operation shown in the flow chart of FIG. 5.
Figure 7:
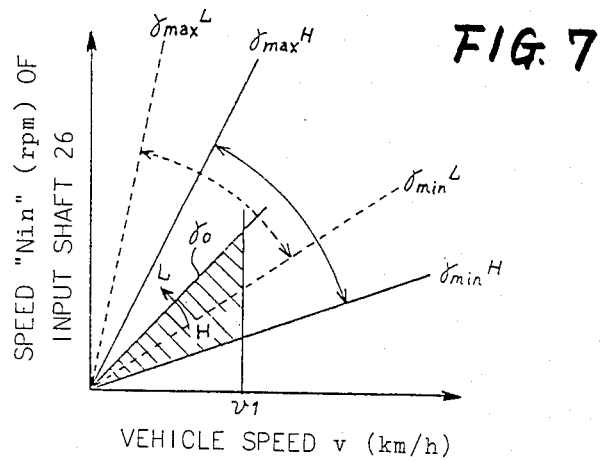

If the actual running speed v of the vehicle is higher than the predetermined value v2, the control routine of FIG. 5 is terminated. If the running speed v is lower than or equal to the predetermined value v1, step S7 and the subsequent steps are implemented. In step S7, the control device 330 judges whether the actual throttle opening $\theta$ is smaller than or equal to a predetermined value $\theta$1. If not, the control routine is terminated. In other words, this step S7 is provided to prevent the auxiliary transmission 14 from being shifted down if the throttle opening $\theta$ is smaller than the preset value $\theta$1 even when the vehicle speed v is low. The value $\theta$1 is determined so as to attain this purpose. If the throttle opening $\theta$ is smaller than or equal to the value $\theta$1, step S7 is followed by step S8 to check to see if the actual speed ratio $\gamma$ is smaller than or equal to a value $\gamma$o indicated in FIG. 7. The shift condition of FIG. 7 is determined so as to be used when the vehicle speed v has been lowered below the value v1 while the actual throttle opening $\theta$ (currently required output of the engine 8) is relatively low. Namely, step S8 is for checking whether or not the current vehicle condition falls within a range indicated in hatched lines in FIG. 7.

In the case where the speed ratio $\gamma$ is found in step S8 to be larger than the value $\gamma$o (that is, falls within the hatched range of FIG. 7), the control routine is terminated. If the judgement in step S8 reveals that the speed ratio $\gamma$ is smaller than or equal to the value $\gamma$o (that is, not within the hatched range of FIG. 7), step S8 is followed by step S11 in which the solenoid valve 314 is energized, whereby the auxiliary transmission 14 is shifted from the high-range position down to the low-range position.

Figure 8:
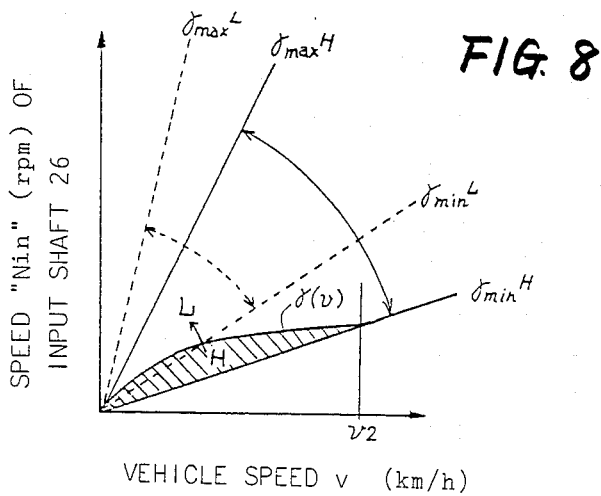

If the judgements in steps S5 and S6 reveal that the actual running speed v is higher than the value v1 but lower than or equal to the value v2, step S6 is followed by step S9 to check if the actual throttle opening $\theta$ is larger than or equal to a predetermined value $\theta$. This comparison is made to judge whether the accelerator pedal of the vehicle has been depressed to kick down the auxiliary transmission 14. If the throttle opening $\theta$ is not larger than or equal to the value $\theta$2, the control routine is terminated. If the throttle opening $\theta$ exceeds or is equal to the value $\theta$2, step S9 is followed by step S10 to check if the actual speed ratio $\gamma$ is smaller than or equal to a value $\gamma$(v) indicated in FIG. 8. The shift condition of FIG. 8 is determined so as to be used when the vehicle speed v has been lowered below the value v2 (when a shift-down operation of the auxiliary transmission 14 is possible) while the actual throttle opening $\theta$ (currently required output of the engine 8) is relatively high. For example, the shift condition of FIG. 8 is used while the running speed v falls within a kick-down range. Namely, step S8 is for checking whether or not the current vehicle condition falls within a range indicated in hatched lines in FIG. 8.

In the case where the actual speed ratio $\gamma$ is found in step S10 to be larger than the value $\gamma$(v), that is, falls within the hatched range of FIG. 8, the control routine of FIG. 5 is terminated. If the judgement in step S10 indicates that the actual speed ratio $\gamma$ is smaller than or equal to the value $\gamma$(v), that is, not within the hatched range of FIG. 8, step S10 is followed by step S11 to energize the solenoid valve 314, whereby the auxiliary transmission 14 is shifted from the high-range position down to the low-range position.

With the above-described steps repeatedly executed, the auxiliary transmission 14 can be shifted across its high-range and low-range positions, with a minimum shift-up or shift-down shock given to the power transmitting system.

As is apparent from the foregoing description, the auxiliary transmission 14 is permitted to be shifted from the low-range position up to the high-range position only when the actual speed ratio $\gamma$ of the CVT 12 is smaller than or equal to the predetermined value $\gamma(\theta)$, that is, only when the speed ratio $\gamma$ and the throttle opening $\theta$ are held within a comparatively low range of FIG. 6 (hatched area), in which the overall speed ratio of the power transmitting system consisting of the CVT 12 and the auxiliary transmission 14 is held below a level at which the power transmitting system is less likely to be subject to a shift-up shock. Further, the value $\gamma(\theta)$ is reduced as the throttle opening $\theta$ is increased, as indicated in FIG. 6. This prevents the shift-up operation of the auxiliary transmission 14 when the output torque of the engine 8 and the moment of inertia of the auxiliary transmission 14 are relatively large, thereby avoiding otherwise possible shift-up shock of the transmitting system.

On the other hand, the auxiliary transmission 14 is permitted to be shifted from the high-range position down to the low-range position only where the actual speed ratio $\gamma$ of the CVT 12 is smaller than or equal to the predetermined value $\gamma_0$ or $\gamma(v)$, that is, only where the condition of the vehicle falls within a range of FIG. 7 or 8 (hatched area), in which the overall speed ratio of the power transmitting system is held below a level at which the power transmitting system is less likely to be subject to a shift-down shock. In this connection, it is noted that the predetermined value $\gamma(v)$ used in step S10 is reduced as the running speed v is increased, when the vehicle is in a kick-down condition in which the vehicle speed is relatively low and the currently required output of the engine 8 is relatively high. Accordingly, an increase in the speed of the engine 8 and a consequent shock of the transmitting system are effectively restrained in a shift-down operation of the auxiliary transmission 14 even in such kick-down condition.

In summary, the present embodiment is adapted to suitably determine the shift-up and shift-down timings of the auxiliary transmission 14, based on the actually detected speed ratio $\gamma$ of the CVT 12, as well as on the actually detected vehicle running speed v and throttle opening $\theta$ of the throttle valve 84 (currently required output of the engine 8), according to the predetermined relations indicated in FIGS. 6, 7 and 8. Hence, the shifting control of the auxiliary transmission 14 is accomplished under an optimum condition depending upon the varying speed ratio $\gamma$ of the CVT 12, so as to protect the power transmitting system against undesirable shifting shocks.

Referring next to FIGS. 10A–10C through 15, a modified embodiment of the invention will be described. The same reference numerals and characters as used in the preceding embodiment will be used in this modified embodiment, to identify the corresponding elements. In the interest of brevity, repeated description of these elements will not be provided.

Figure 10A:
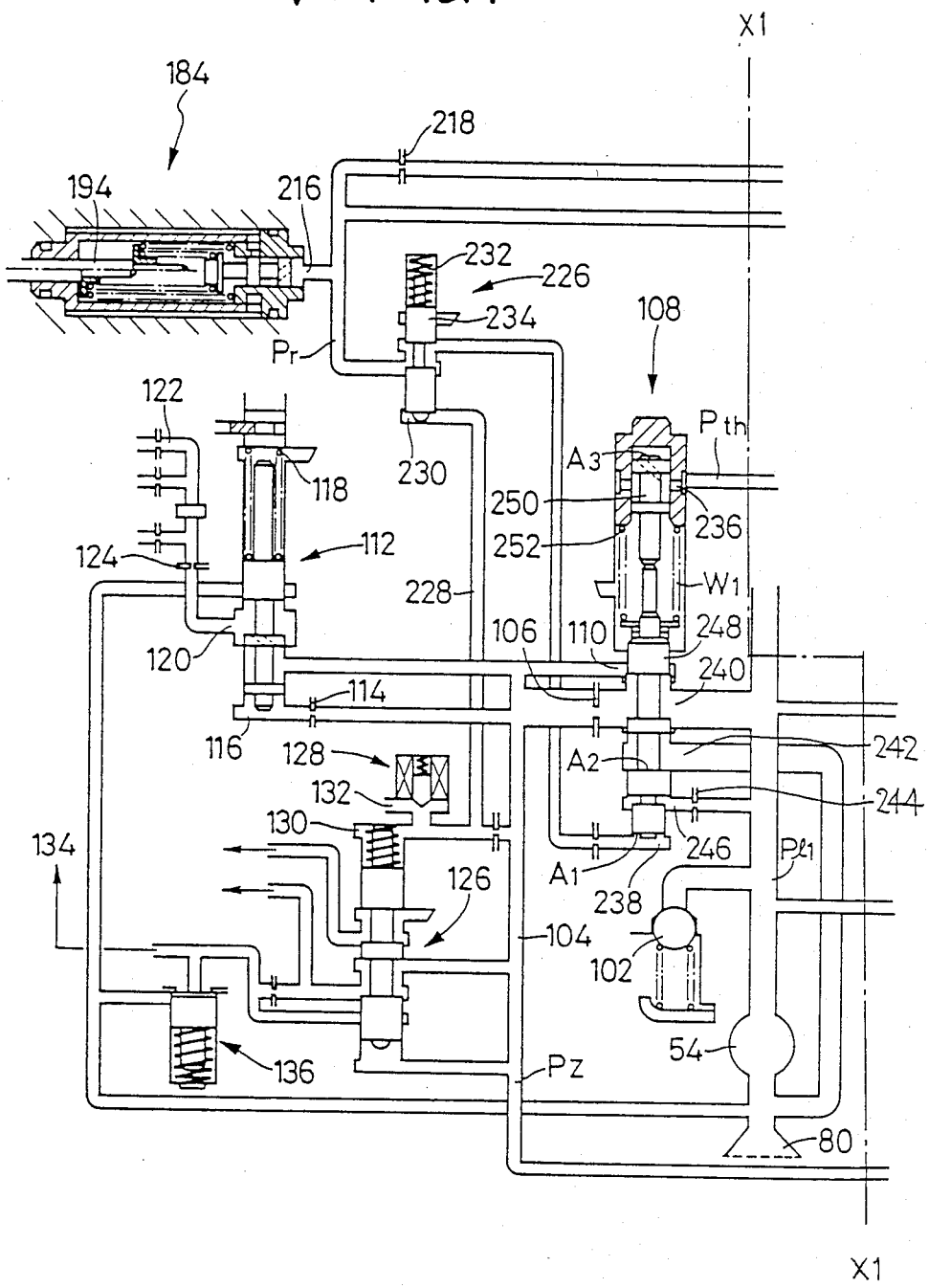
FIGS. 10A, 10B and 10C are schematic views of a hydraulic system, corresponding to FIGS. 3A, 3B and 3C, to which a modified embodiment of the invention is applied.
Figure 10B:
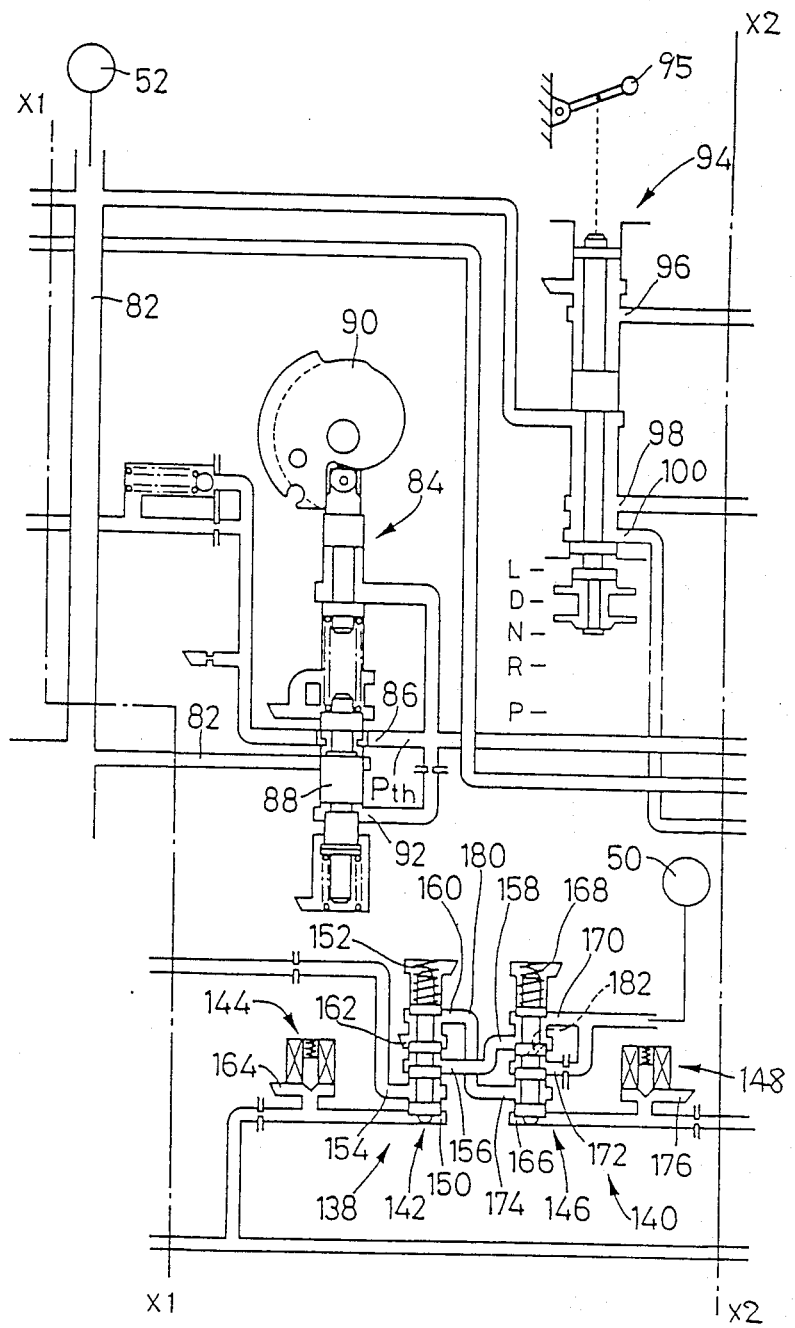
Figure 10C:
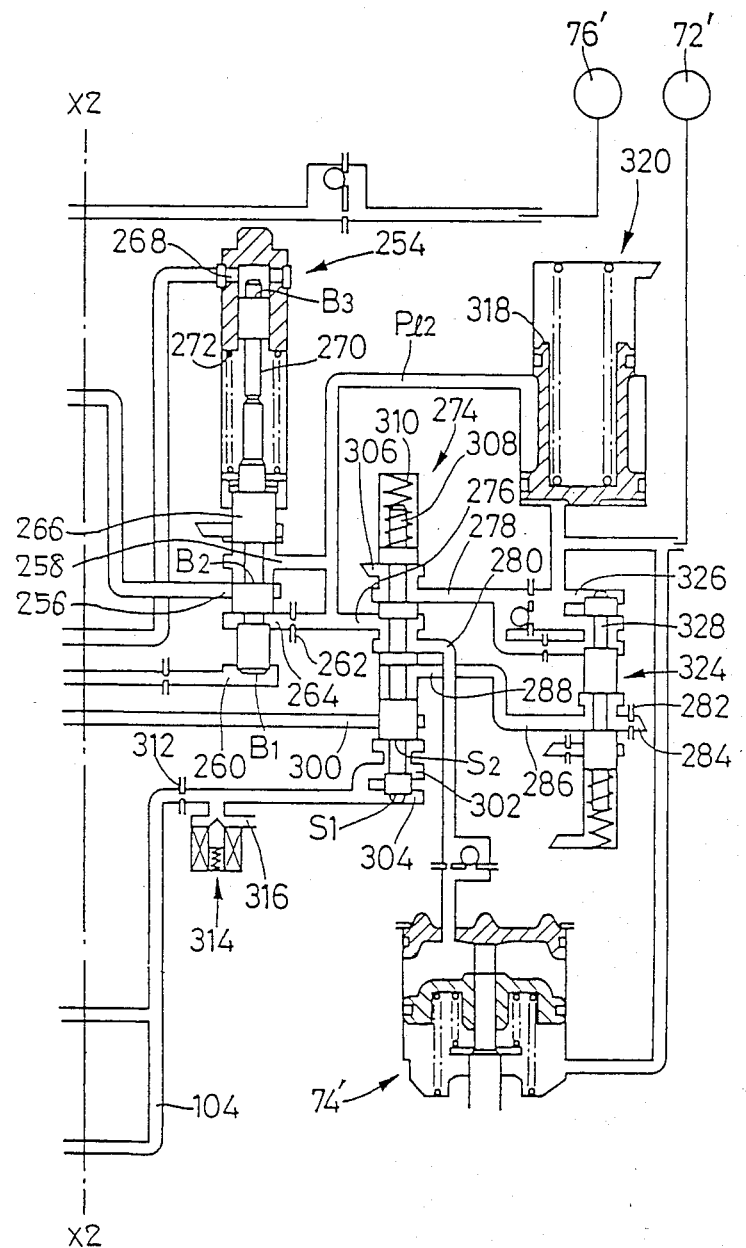

A hydraulic system of the present embodiment shown in FIGS. 10A, 10B and 10C is identical with that of the preceding embodiment of FIGS. 3A, 3B and 3C, except that the manual valve 94 (operated by the shift lever 95) does not have a shift position S (Second), and the auxiliary transmission 14 is operated in response to the operation of the shift lever 95. Further, the electronic control device 330 is adapted to execute a routine shown in FIG. 11, when the control device 330 is placed in a manual shift mode. In this routine, the control device 330 receives the various output signals from the sensors 350, 352, 354, 356 and 358 previously indicated, after the control device 330 is initialized. These steps are not shown in FIG. 11. Subsequently, the control device 330 executes step SM0 to determine the running speed v of the vehicle, speed ratio $\gamma$ of the CVT 12, etc., based on the received signals. As will be described in greater detail, the main control routine of FIG. 11 includes routines (steps SM3 and SM6) for checking whether the vehicle is placed in the condition that permits a shift-up or shift-down operation of the auxiliary transmission 14 between its low-range and high-range positions, in response to the operation of the shift lever 95. The main control routine further includes a routine (not shown) for adjusting the speed ratio $\gamma$ of the CVT 12 so as to establish the currently required output of the engine 8 with a minimum fuel consumption.

Step SM0 is followed by step SM1 wherein the SHIFT POSITION signal from the shift position sensor 358 is checked to judge whether the shift lever 95 has been shifted from the Low position L to the Drive position D. If the judgement in step SM1 is affirmative (YES), step SM1 is followed by step SM3 to perform a shift-up control routine for controlling a shift-up operation of the auxiliary transmission 14. If the judgement in step SM1 is negative (NO), step SM2 is executed to check if the content of a SHIFT flag is "1" or not. If the content of the flag is "1", the control device 330 goes to step SU2 of the shift-up control routine shown in FIG. 12. That is, the content "1" of the SHIFT flag indicates that the control is placed in a shift-up control mode.

Steps SM2 and SM3 are followed by step SM4 wherein the SHIFT POSITION signal from the shift position sensor 358 is checked to see if the shift lever 95 has been shifted down from the Drive position D to the Low position L. If the judgement in step SM4 is affirmative, step SM4 is followed by step SM6 to perform a shift-down control routine for controlling a shift-down operation of the auxiliary transmission 14. If the judgement in step SM4 is negative (NO), step SM5 is executed to check if the content of the SHIFT flag is "2" or not. If the content of the flag is "2", the control device 330 goes to step SD2 of the shift-down control routine shown in FIG. 13. That is, the content "2" of the SHIFT flag indictes that the control is placed in a shift-down control mode.

Figure 11:
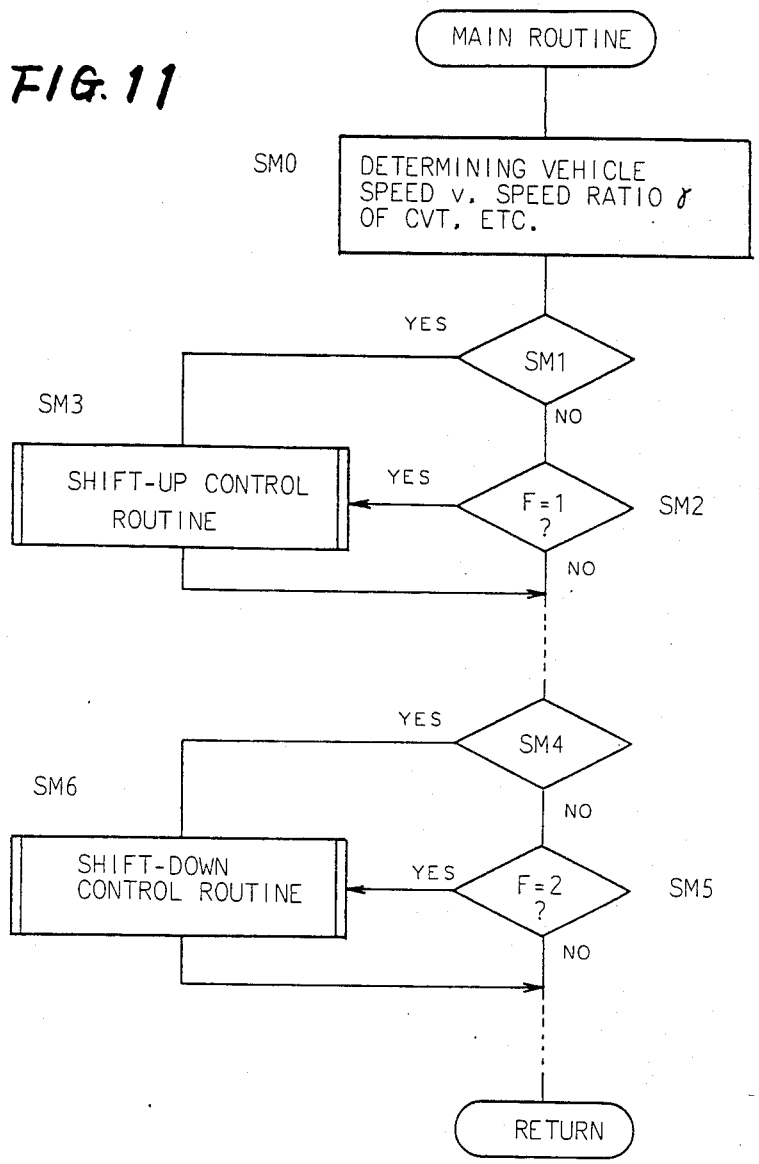
FIG. 11 is a flow chart showing a main control routine of the above modified embodiment of the invention.

Referring to FIGS. 12 and 13, there will be described the operations of the shift-up and shift-down control routines generally indicted at steps SM3 and SM6 in FIG. 11.

Figure 14:
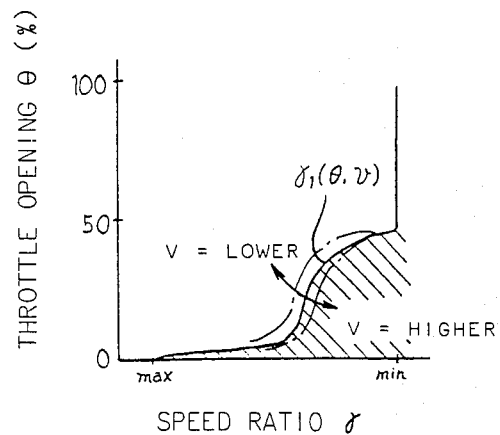
FIGS. 14 and 15 are graphs showing ranges of reference values used in the operation shown in the flow chart of FIG. 11.

In the shift-up control routine of FIG. 12, step SU1 is initially executed to set the SHIFT flag to "1". Then, step SU2 is executed to check if the actual speed ratio $\gamma$ of the CVT 12 is smaller than a predetermined value $\gamma_1(\theta, v)$. This value is determined based on the detected actual opening $\theta$ of the throttle valve 84 and running speed v of the vehicle, according to a predetermined relation among these values $\gamma_1(\theta, v)$, $\theta$ and v. For example, the value $\gamma_1(\theta, v)$ is a function of the throttle opening $\theta$ and the vehicle speed v, as indicated in FIG. 14. Namely, step SU2 is implemented to check if the current vehicle condition (throttle opening $\theta$ and running speed v) falls within a range indicated in hatched lines in FIG. 14.

If step SU2 reveals that the actual speed ratio γ of the CVT 12 is not smaller than the predetermined value γ1(θ, v), step SU2 is followed by step SU3 wherein the solenoid valve 314 is held in its ON position, whereby the auxiliary transmission 14 is held in its low-range position. The control device 330 then goes back to the main routine of FIG. 11. On the other hand, if the actual speed ratio γ of the CVT 12 is found in step SU2 to be smaller than the predetermined value γ1(θ, v), step SU4 is executed to turn off the solenoid valve 314 in order to shift the auxiliary transmission 14 to its high-range position. Successively, step SU5 is implemented to reset the SHIFT flag to "0", and the control goes back to the main routine of FIG. 11. As indicated above, when the shift lever 95 has been moved from its Low position L to its Drive position D, the solenoid valve 314 is turned off to shift up the auxiliary transmission 14 only if the detected current throttle opening θ and vehicle speed v fall within the range indicated in hatched lines in FIG. 14.

In the shift-down control routine of FIG. 13, step SD1 is initially executed to set the SHIFT flag to "2". Then, step SD2 is executed to check if the actual speed "Nin" of the input shaft of the auxiliary transmission 14 (speed "Nout" of the output shaft 34 of the CVT 12) which corresponds to the actual vehicle speed v is smaller than a predetermined value "No". This value "No" is determined to avoid an excessive rise of the engine speed and a shift-down shock to the transmitting system when the auxiliary transmission 14 is shifted down while the speed "Nin" is higher than the value "No". If the actual speed "Nin" is not smaller than the predetermined value "No", step SD2 is followed by step SD4 wherein the solenoid valve 314 is held in its OFF position, whereby the auxiliary transmission 14 is held in its high-range position. The control device 330 then goes back to the main routine of FIG. 11.

Figure 15:
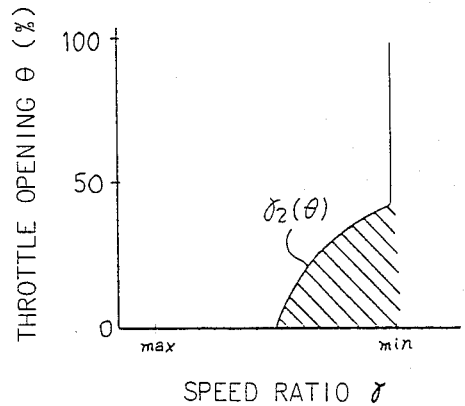

On the other hand, if the actual speed "Nin" of the input shaft of the auxiliary transmission 14 is smaller than the predetermined value "No", step SD2 is followed by step SD3 to check if the actual speed ratio γ is smaller than a predetermined value γ2(θ). This value is determined based on the actual throttle opening θ, and according to a predetermined relation between the throttle opening θ and the speed ratio γ. For example, the value γ2(θ) is determined as a function of the throttle opening θ, as indicated in FIG. 15. Namely, step SD3 is executed to see if the current vehicle condition, i.e., throttle opening θ, falls within a range indicated in hatched lines in FIG. 15.

With the shift-down control routine of FIG. 13 executed, the auxiliary transmission 14 can be shifted from its high-range position to its low-range position with a minimum shift-down shock, when the shift lever 95 is moved to its Low position L.

As is apparent from the foregoing description, when the shift lever 95 is moved from its Low position L to its Drive position D, the auxiliary transmission 14 is shifted from the low-range position up to the high-range position, only where the actual speed ratio γ of the CVT 12 is smaller than the predetermined value γ1(θ, v), that is, only where the speed ratio γ and the throttle opening θ are held within a comparatively low range of FIG. 14 (hatched area), in which the overall speed ratio of the power transmitting system consisting of the CVT 12 and the auxiliary transmission 14 is held below a level at which the power transmitting system is less likely to be subject to a shift-up shock. Further, the predetermined value γ1(θ, v) is reduced as the throttle opening θ is increased, as indicated in FIG. 14. This prevents the shift-up operation of the auxiliary transmission 14 when the output torque of the engine 8 and the moment of inertia of the auxiliary transmission 14 are relatively large, thereby avoiding otherwise possible shift-up shock of the transmitting system. In other words, decreasing the value γ1(θ, v) with an increase in the throttle opening θ allows time for the moment of inertia of the CVT 12 to be lowered before the auxiliary transmission 14 is shifted up. Furthermore, the value γ1(θ, v) is increased as the vehicle speed v and the throttle opening θ are decreased. This makes it possible to shift down the auxiliary transmission 14 before the vehicle is stopped, for example, at a crossing, and to start the vehicle with the auxiliary transmission 14 placed in its low-range position.

When the shift lever 95 is moved from its Drive position D to its Low position L, on the other hand, the auxiliary transmission 14 is shifted from the high-range position down to the low-range position, only where the speed "Nin" of the input shaft of the auxiliary transmission 14 (corresponding to the vehicle speed v) is smaller than the predetermined value "No" (below which an excessive shift-down shock will not occur) while at the same time the actual speed ratio γ of the CVT 12 is smaller than the predetermined value γ2(θ), that is, only where the condition of the vehicle falls within a range of FIG. 15 (hatched area), in which the overall speed ratio of the power transmitting system is held below a level at which the power transmitting system is less likely to be subject to a shift-down shock. In this connection, it is noted that the predetermined value γ2(θ) is reduced with an increase in the throttle opening θ, as indicated in FIG. 15, in order to allow time for the moment of inertia of the CVT 12 to be lowered before the auxiliary transmission 14 is shifted down.

In summary, the present modified embodiment is adapted to suitably determine the shift-up and shift-down timings of the auxiliary transmission 14, based on the detected actual speed ratio γ of the CVT 12, as well as on the detected actual vehicle running speed v and throttle opening θ of the throttle valve 84 (currently required output of the engine 8), according to the predetermined relations indicated in FIGS. 14 and 15. Hence, the shifting control of the auxiliary transmission 14 is accomplished under an optimum condition depending upon the varying speed ratio γ of the CVT 12, so as to protect the power transmitting system against undesirable shifting shocks.

While the present invention has been described in its preferred embodiments, it is to be understood that the invention may be otherwise embodied.

For example, although the shift-down control routine in the first embodiment selectively uses one of the two different predetermined relations of FIGS. 6 and 7, depending upon the actual throttle opening θ, it is possible that the predetermined value γo or γ(v) is given as a function of the throttle opening θ.

As another modification, the currently required output of the engine 8 may be determined or detected by sensing an amount of depression of an accelerator pedal of the vehicle, or a pressure in an intake manifold of the engine 8, rather than by detecting the throttle opening θ of the throttle valve 84.

In the illustrated embodiments, the auxiliary transmission 14 is directly connected to the output side of the CVT 12. However, the position of the transmission 14 in the transmitting system may be selected as needed.

It is to be understood that the forms of the invention herein shown and described are to be taken as preferred examples of the same, and that various changes, modifications and improvements may be made in the invention, without departing from the spirit and scope of the invention defined in the appended claims.

What is claimed is:

1. A method of controlling a power transmitting system for an automotive vehicle which includes an engine, the power transmitting system having a continuously variable transmission with a continuously variable speed ratio, and an auxiliary transmission which is connected in series with the continuously variable transmission and which has at least two shift positions for forward driving of the vehicle, wherein the auxiliary transmission is automatically shifted from one of said at least two shift positions to the other, said method comprising the step of:

automatically shift said auxiliary transmission from one of said at least two shift positions to the other based on an actual running speed of said vehicle, an actually required power output of said engine, and an actual speed ratio of said continuously variable transmission.

2. A method of controlling a power transmitting system according to claim 1, wherein said actually required power output of said engine is determined by detecting an opening of a throttle valve disposed in an intake manifold of the engine of said automotive vehicle.

3. A method of controlling a power transmitting system according to claim 1, wherein said at least two shift positions comprise a low-range position and a high-range position providing higher speeds of said vehicle than said low-range position, said auxiliary transmission being shifted from said low-range position to said high-range position when said actual running speed of said vehicle is higher than or equal to a predetermined value and said actual speed ratio is smaller than or equal to a value which is determined in relation to the actually required power output of said engine.

4. A method of controlling a power transmitting system according to claim 3, wherein said value determined in relation to the actually required power output of said engine is reduced as said actually required power output is increased.

5. A method of controlling a power transmitting system according to claim 1, wherein said at least two shift positions comprise a high-range position and a low-range position providing lower speeds of said vehicle than said high-range position, said auxiliary transmission being shifted from said high-range position to said low-range position when said actually required power output of said engine, said actual running speed of said vehicle, and said actual speed ratio of said continuously variable transmission are smaller than or equal to respective predetermined values.

6. A method of controlling a power transmitting system according to claim 1, wherein said at least two shift positions comprise a high-range position and a low-range position providing lower speeds of said vehicle than said high-range position, said auxiliary transmission being shifted from said high-range position to said low-range position when said actual running speed of said vehicle is lower than or equal to a predetermined value, said actually required power output of said engine is larger than or equal to a predetermined value, and said actual speed ratio of said continuously variable transmission is smaller than or equal to a value determined in relation to the running speed of said vehicle.

7. A method of controlling a power transmitting system according to claim 6, wherein said value determined in relation to the running speed of said vehicle is reduced as said running speed is increased.

8. An apparatus for controlling a power transmitting system for an automotive vehicle which includes an engine, the power transmitting system having a continuously variable transmission with a continuously variable speed ratio, and an auxiliary transmission which is connected in series with the continuously variable transmission and which has at least two shift positions for forward driving of the vehicle, said apparatus comprising:

means for detecting an actual running speed of said vehicle;

means for detecting an actually required power output of said engine;

means for detecting an actual speed ratio of said continuously variable transmission; and control means for determining a timing at which said auxiliary transmission is shifted from one of said at least two shift positions to the other, said control means determining said timing based upon the detected actual running speed of said vehicle, the detected actually required power output of said engine, and the detected actual speed ratio of said continuously variably transmission, and according to a predetermined relation among said actual running speed, said actually required power output, and said actual speed ratio, said control means controlling said auxiliary transmission so as to be shifted at the determined timing.

9. An apparatus according to claim 8, wherein said means for detecting an actually required power output of said engine detects an opening of a throttle valve disposed in an intake manifold of the engine of said automotive vehicle.

10. An apparatus according to claim 8, wherein said at least two shift positions comprise a low-range position and a high-range position providing higher speeds of said vehicle than said low-range position, said control means controlling said auxiliary transmission so as to be shifted from said low-range position to said high-range position when said actual running speed of said vehicle is higher than or equal to a predetermined value and said actual speed ratio is smaller than or equal to a value which is determined in relation to the actually required power output of said engine.

11. An apparatus according to claim 10, wherein said value determined in relation to the actually required power output of said engine is reduced as said actually required power output is increased.

12. An apparatus according to claim 8, wherein said at least two shift positions comprise a high-range position and a low-range position providing lower speeds of said vehicle than said high-range position, said control means controlling said auxiliary transmission so as to be shifted from said high-range position to said low-range position when said actually required power output of said engine, said actual running speed of said vehicle, and said actual speed ratio of said continuously variable transmission are smaller than or equal to respective predetermined values.

13. An apparatus according to claim 8, wherein said at least two shift positions comprise a high-range position and a low-range position providing lower speeds of said vehicle than said high-range position, said auxiliary transmission being shifted from said high-range position to said low-range position when said actual running speed of said vehicle is lower than or equal to a predetermined value, said actually required power output of said engine is larger than or equal to a predetermined value, and said actual speed ratio of said continuously variable transmission is smaller than or equal to a value determined in relation to the running speed of said vehicle.

14. An apparatus according to claim 13, wherein said value determined in relation to the running speed of said vehicle is reduced as said running speed is increased.

15. A method of controlling a power transmitting system for an automotive vehicle which includes an engine, the power transmitting system having a continuously variable transmission with a continuously variable speed ratio, and an auxiliary transmission which is connected in series with the continuously variable transmission and which has at least two shift positions for forward driving of the vehicle, wherein the auxiliary transmission is shifted from one of said at least two shift positions to the other in response to an operation of a shift lever, said method comprising the step of:
determining a condition which permits said auxiliary transmission to be shifted from one of said at least two shift positions to the other based on an actually required power output of said engine, an actual running speed of said vehicle, and an actual speed ratio of said continuously variable transmission.

16. A method of controlling a power transmitting system according to claim 15, wherein said actually required power output of said engine is determined by detecting an opening of a throttle valve disposed in an intake manifold of an engine of said automotive vehicle.

17. A method of controlling a power transmitting system according to claim 15, wherein said at least two shift positions comprise a low-range position and a high-range position providing higher speeds of said vehicle than said low-range position, said auxiliary transmission being shifted from said low-range position to said high-range position when said actual speed ratio of said continuously variable transmission is smaller than or equal to a value which is predetermined in relation to said actual running speed of said vehicle and said actually required power output of said engine.

18. A method of controlling a power transmitting system according to claim 15, wherein said at least two shift positions comprise a high-range position and a low-range position providing lower speeds of said vehicle than said high-range position, said auxiliary transmission being shifted from said high-range position to said low-range position when said actual running speed of said vehicle is lower than or equal to a predetermined value, and said actual speed ratio of said continuously variable transmission is smaller than or equal to a value which is determined in relation to said actually required power output of said engine.

19. An apparatus for controlling a power transmitting system for an automotive vehicle which includes an engine, the power transmitting system having a continuously variable transmission with a continuously variable speed ratio, and an auxiliary transmission which is connected in series with the continuously variable transmission and which has at least two shift positions for forward driving of the vehicle, wherein the auxiliary transmission is operated in response to the operation of a shift lever which has at least two operating positions corresponding to said at least two shift positions, said apparatus comprising:
means for detecting a currently selected operating position of said shift lever;
means for detecting an actually required power output of said engine;
means for detecting an actual running speed of said vehicle;
means for detecting an actual speed ratio of said continuously variable transmission; and
control means for determining a condition which permits said auxiliary transmission to be shifted to one of said at least two shift positions which corresponds to said currently selected operating position of said shift lever, said control means determining said condition based on the detected actually required power output of said engine, the detected actual running speed of said vehicle, and the detected actual speed ratio of said continuously variable transmission, and according to a predetermined relation among said detected actually required power output, said detected actual running speed, and said detected actual speed ratio, said control means controlling said auxiliary transmission so as to be shifted to said one shift position when said condition is satisfied after said currently selected operating position is detected.

20. An apparatus according to claim 19, wherein said means for detecting an actually required power output of said engine detects an opening of a throttle valve disposed in an intake manifold of the engine of said automotive vehicle.

21. An apparatus according to claim 19, wherein said at least two shift positions comprise a low-range position and a high-range position providing higher speeds of said vehicle than said low-range position, said control means controlling said auxiliary transmission so as to be shifted from said low-range position to said high-range position when said actual running speed of said vehicle is higher than or equal to a predetermined value and said actual speed ratio is smaller than or equal to a value which is determined in relation to the actually required power output of said engine.

22. An apparatus according to claim 21, wherein said value determined in relation to the actually required power output of said engine is reduced as said actually required power output is increased.

23. An apparatus according to claim 19, wherein said at least two shift positions comprise a high-range position and a low-range position providing lower speeds of said vehicle than said high-range position, said control means controlling said auxiliary transmission so as to be shifted from said high-range position to said low-range position when said actually required power output of said engine, said actual running speed of said vehicle, and said actual speed ratio of said continuously variable transmission are smaller than or equal to respective predetermined values.

24. An apparatus according to claim 19, wherein said at least two shift positions comprise a high-range position and a low-range position providing lower speeds of said vehicle than said high-range position, said auxiliary transmission being shifted from said high-range position to said low-range position when said actual running speed of said vehicle is lower than or equal to a predetermined value, said actually required power output of said engine is larger than or equal to a predetermined value, and said actual speed ratio of said continuously variable transmission is smaller than or equal to a value determined in relation to the running speed of said vehicle.

25. An apparatus according to claim 24, wherein said value determined in relation to the running speed of said vehicle is reduced as said running speed is increased.

* * * * *